United States Patent
Lee et al.

(10) Patent No.: US 9,100,970 B2
(45) Date of Patent: Aug. 4, 2015

(54) METHOD AND APPARATUS FOR CONTROLLING NEIGHBOR CELL INTERFERENCE

(75) Inventors: Hee Soo Lee, Daejeon (KR); Jae Young Ahn, Daejeon (KR); Nam Hoon Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 353 days.

(21) Appl. No.: 13/501,646

(22) PCT Filed: Oct. 12, 2010

(86) PCT No.: PCT/KR2010/006977
§ 371 (c)(1),
(2), (4) Date: Apr. 12, 2012

(87) PCT Pub. No.: WO2011/046350
PCT Pub. Date: Apr. 21, 2011

(65) Prior Publication Data
US 2012/0202540 A1     Aug. 9, 2012

(30) Foreign Application Priority Data

Oct. 12, 2009 (KR) .................. 10-2009-0096518
Nov. 2, 2009 (KR) .................. 10-2009-0104952

(51) Int. Cl.
*H04B 1/00* (2006.01)
*H04W 72/08* (2009.01)

(52) U.S. Cl.
CPC .................................. *H04W 72/082* (2013.01)

(58) Field of Classification Search
USPC .............. 455/522, 69–70, 63.1, 67.11, 67.13; 370/315–320
See application file for complete search history.

(56) References Cited

U.S. PATENT DOCUMENTS

| | | | |
|---|---|---|---|
| 2005/0282550 A1 | 12/2005 | Cho et al. | |
| 2007/0155431 A1 | 7/2007 | Munzner et al. | |
| 2007/0242782 A1 | 10/2007 | Han et al. | |
| 2008/0032632 A1 | 2/2008 | Choi et al. | |

FOREIGN PATENT DOCUMENTS

| | | |
|---|---|---|
| KR | 1020080013069 | 2/2008 |
| WO | 2011/046350 A2 | 4/2011 |

OTHER PUBLICATIONS

Motorola, "Femtocell and Macrocell Interference Coordination based on SFR," 3GPP TSG-RAN WG4 #2, R4-093349 (2009).
International Search Report and Written Opinion for Application No. PCT/KR2010/006977, pp. 1-8, dated Oct. 12, 2010.

*Primary Examiner* — Fayyaz Alam
(74) *Attorney, Agent, or Firm* — Nelson Mullins Riley & Scarborough LLP (57) ABSTRACT

A method for managing neighbor cell interference comprises: a step of measuring inter-cell interference control information by subframe units; and a step of transmitting the inter-cell interference control information measured by subframe units, to at least one neighbor cell for each of the subframes. The interference management method of the present invention dynamically performs neighbor cell interference management under the condition where neighbor cell interference changes in terms of time, thus improving performance of a system. Further, the interference management method of the present invention maps a wireless resource property pattern to a cell ID. Consequently, the system adopting the method of the present invention exhibits excellent performance in any environment.

18 Claims, 4 Drawing Sheets

FIG. 4

| 0 | H |
|---|---|
| 0 | H |
| ⋮ | ⋮ |
| 0 | H |
| 0 | H |

|← Subframe 0 →|← Subframe 1 →|

METHOD AND APPARATUS FOR CONTROLLING NEIGHBOR CELL INTERFERENCE

RELATED APPLICATIONS

This application is a 35 U.S.C. §371 filing of International Application Number PCT/KR2010/006977 which was filed on Oct. 12, 2010, which claims priority to, and the benefit of, Korean Application Nos.: 10-2009-0096518, filed on Oct. 12, 2009; and 10-2009-0104952, filed on Nov. 2, 2009. The contents of the aforementioned application are hereby incorporated herein by reference.

BACKGROUND

1. Technical Field

Example embodiments of the present invention relate to methods of controlling interference between neighboring cells and apparatuses for managing interference.

2. Related Art $3^{rd}$ generation partnership project (3GPP) long term evolution (LTE) systems effectively manage neighboring cell's interference by defining inter-cell interference control information such as relative narrowband transmit power (RNTP), an RNTP threshold, an uplink (UL) high interference indication (HII), and a UL interference overload indication (IOI) and by causing the inter-cell interference control information to be exchanged between cells.

An RNTP value for a certain physical resource block (PRB) may be 0 or 1. Here, RNTP value 0 means that maximum transmit power of the PRB does not exceed a certain threshold, and RNTP value 1 means that the maximum transmit power is not limited. The RNTP threshold is a parameter which decides a threshold for the above-described maximum transmit power.

A UL HII value for the certain PRB may be 0 or 1. Here, UL HII value 0 indicates low interference sensitivity, and UL HII value 1 indicates high interference sensitivity.

A UL IOI value for the certain PRB may be one of values of high interference, medium interference, and low interference. The high interference means that neighboring cell's interference to the PRB is high, the low interference means that the neighboring cell's interference to the PRB is low, and the medium interference means that the neighboring cell's interference to the PRB is medium.

As defined above, RNTP, UL HII, and UL IOI can be differently set according to each PRB. Accordingly, an RNTP vector, a UL HII vector, a UL IOI vector, and the like can be defined. An $j^{th}$ element value of the RNTP vector is an RNTP value for an $j^{th}$ PRB. An $j^{th}$ element value of the UL HII vector is a UL HII value for the $j^{th}$ PRB. An $j^{th}$ element value of the UL IOI vector is a UL IOI value for the $j^{th}$ PRB.

In a scheme of a related art, the same RNTP vector, the same UL HII vector, the same UL IOI vector, and the same RNTP threshold are used throughout all subframes. That is, static interference management is performed in a time domain.

As a method of effectively handling neighboring cell's interference, there is a method of classifying radio resources into one or more radio resource groups, generating one or more radio resource attribute patterns from radio resource attributes, mapping radio resource attribute patterns to cell identities (IDs), and enabling each cell to use a radio resource according to a radio resource attribute pattern mapped to each cell's own cell ID.

The performance of the above-described method can be maximized when the following two items are optimally designed.

Radio resource attribute patterns to be used
  Functions of defining mapping between radio resource attribute patterns and cell IDs However, the optimal radio resource attribute pattern and mapping are determined by various environmental factors, for example, a cell density, a frequency band used for radio resource, and the like.

SUMMARY

Accordingly, example embodiments of the present invention are provided to substantially obviate one or more problems due to limitations and disadvantages of the related art.

Example embodiments of the present invention provide a method of dynamically managing neighboring cell's interference in a situation where the neighboring cell's interference varies with time.

Example embodiments of the present invention also provide an interference control method of mapping radio resource attribute patterns to cell identities (IDs) that can exhibit excellent performance in any environment.

In some example embodiments, a method of controlling interference between neighboring cells includes: differently setting inter-cell interference control information in a time domain; and transmitting the inter-cell interference control information differently set in the time domain to at least one neighboring cell. The inter-cell interference control information may include at least one of a relative narrowband transmit power (RNTP), an RNTP threshold, a uplink (UL) high interference indication (HII), and a uplink (UL) interference overload indication (IOI). The inter-cell interference control information may include another type of information other than the RNTP, RNTP threshold, UL HII, and UL IOI. The differently setting inter-cell interference control information in a time domain may include differently setting the inter-cell interference control information for each subframe. The differently setting inter-cell interference control information in a time domain may include setting a transmit power of resource elements of all physical resource block of a predetermined subframe to be substantially zero, the resource elements may be used for transmitting a UE-specific Physical downlink shared channel (PDSCH). The method may be used in a heterogeneous network deployment in which a low-power cell and a high-power cell are mixed. The method may be used in at least one of a first heterogeneous deployment in which a first macrocell and a femtocell are deployed and a second heterogeneous deployment in which a second macrocell and a picocell are deployed.

In other example embodiments, a method of controlling interference between neighboring cells includes: differently setting a maximum transmit power of resource elements of physical resource block in a time domain, the resource elements being used for transmitting a UE-specific Physical downlink shared channel (PDSCH); and transmitting the maximum transmit power of the resource elements of the physical resource block to at least one neighboring cell. The maximum transmit power of the resource elements of the physical resource block may be differently set for each subframe. In a first subframe, the transmit power of the resource elements of all physical resource block may have a substantially zero, and in a second subframe, the transmit power of the resource elements of the physical resource block may have different value or the same value.

In still other example embodiments, an interference control method of managing an interference between neighboring cells includes: transmitting a selected radio resource attribute pattern set to at least one cell that is managed by an interference control apparatus; and transmitting a function, which maps a radio resource attribute pattern to a cell identify (ID) for each of the at least one cell that is managed by the interference control apparatus, to the at least one cell that is managed by the interference control apparatus. The methods may further include selecting an optimal radio resource attribute pattern set from at least one radio resource attribute pattern set in consideration of a system environment. The method may further include selecting an optimal mapping function from at least one function of mapping the radio resource attribute pattern to the cell ID in consideration of the system environment. The method may further include controlling a radio resource to be used according to the radio resource attribute pattern mapped to the cell ID of each of the at least one cell that is managed by the interference control apparatus on the basis of the selected radio resource attribute pattern and the selected mapping function of defining mapping between the radio resource attribute pattern and the cell ID. Each of the at least one cell that is managed by the interference control apparatus may provide the interference control apparatus with information including at least one of the number of neighboring cells and neighboring cell IDs, the number of neighboring cells and the neighboring cell IDs may be used to select the optimal radio resource attribute pattern set and an optimal function of mapping an optimal cell ID to a radio resource attribute pattern. The interference control method may be used in at least one of a first heterogeneous deployment in which a first macrocell and a femtocell are deployed and a second heterogeneous deployment in which a second macrocell and a picocell are deployed.

In still other example embodiments, an interference control apparatus for managing interference between neighboring cells transmits a selected radio resource attribute pattern set to at least one cell that is managed by the interference control apparatus, and transmits a function, which maps a radio resource attribute pattern to a cell identity (ID) for each of the at least one cell that is managed by the interference control apparatus, to the at least one cell that is managed by the interference control apparatus. The interference control apparatus may select an optimal radio resource attribute pattern set from at least one radio resource attribute pattern set in consideration of a system environment. The interference control apparatus may select an optimal mapping function from at least one function of mapping the radio resource attribute pattern to the cell ID in consideration of the system environment. The interference control apparatus may control a radio resource to be used according to the radio resource attribute pattern mapped to the cell ID of each of the at least one cell that is managed by the interference control apparatus on the basis of the selected radio resource attribute pattern and the selected mapping function of defining mapping between the radio resource attribute pattern and the cell ID. The interference control apparatus may operate in at least one of a first heterogeneous deployment in which a first macrocell and a femtocell are deployed and a second heterogeneous deployment in which a second macrocell and a picocell are deployed.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

A first example embodiment of the present invention is as follows.

In a scheme of a related art, for each subframe, a relative narrowband transmit power (RNTP) vector, an uplink (UL) high interference indication (HII) vector, a UL interference overload indication (IOI) vector, and an RNTP threshold cannot be differently set. That is, static interference management is performed in a time domain. However, neighboring cell's interference varies with time on various reasons. That is, a cell may be subjected to a different interference pattern according to each subframe. The variation of the interference pattern has a feature that the variation of the interference pattern is repeated by a predetermined period.

Figure 1:
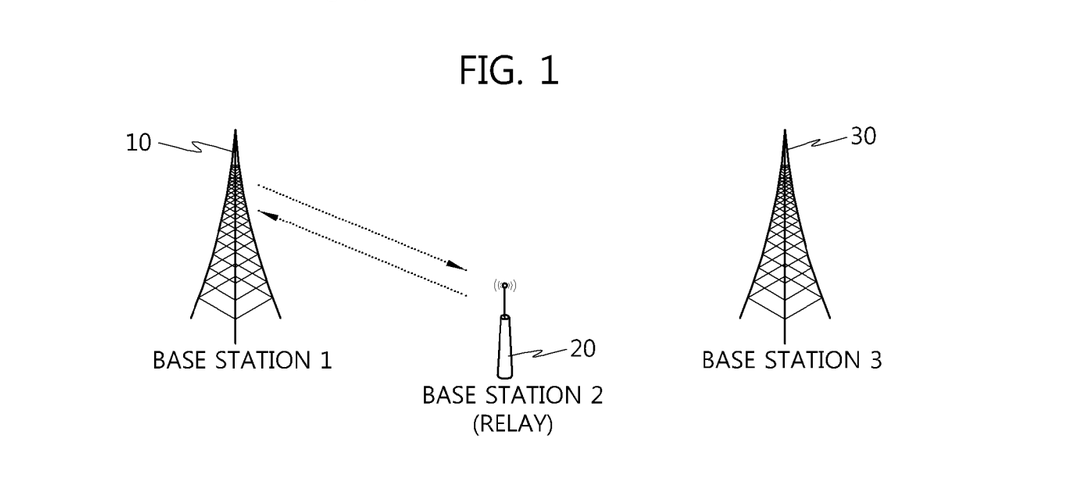
FIG. 1 is a conceptual diagram illustrating an inter-cell interference situation according to an example embodiment of the present invention.

In this regard, an example is as follows. FIG. 1 is a conceptual diagram illustrating an inter-cell interference situation according to an example embodiment of the present invention. The example of FIG. 1 includes three base stations. A base station 2 is a relay base station. That is, the base station 2 has a backhaul link with a base station 1. It is assumed that a base station 3 experiences serious interference with the uplinks(ULs) of the users of which serving base station is the base station 2. Since the base station 2 is the relay base station, some UL subframes are used to transmit data to the base station 1. It is assumed that the base station 2 performs beamforming well enough for avoiding interference and transmits the well beamforming signal to the base station 1. Then, the base station 3 experiences small UL interference in a subframe used by the base station 2. Namely, the base station 2 or transmits data of the subframe to the base station 1. Accordingly, a level of interference to the base station 3 is significantly different between a UL subframe used by the base station 2 in the backhaul link and a UL subframe unused in the backhaul link. If the base station 3 can notify a neighboring cell of an interference level that differs according to each subframe, the neighboring cell can control the transmit power to vary depending upon each subframe by utilizing the information about the interference level that differs according to each subframe, thereby improving the performance.

On the other hand, in a method of the related art, neighboring cells cannot perform transmit power control such that the transmit power may differ according to each subframe since a UL IOI vector varying depending upon each subframe cannot be transmitted when the UL IOI vector is transmitted to the neighboring cells.

An example embodiments of the present invention proposes a method of measuring a UL IOI vector comprised of UL IOI values for physical resource blocks (PRBs) in a subframe and transmitting a subframe-specific UL IOI vector to neighboring cells. That is, when $IOI_k$ is a UL IOI vector of a $k^{th}$ subframe, where k is different from j, $IOI_k$ and $IOI_j$ are separately set and a UL IOI vector of each subframe is reported to at least one of neighboring cells. That is, $IOI_0$, $IOI_1$, $IOI_2$, ... are transmitted to the neighboring cells. The meaning of the subframe-specific UL IOI vector does not exclude a case in which a UL IOI vector is set to have the same vector among a plurality of subframes or among all subframes.

A UL IOI value for a certain PRB may be one of values of high interference, medium interference, and low interference. The high interference means that neighboring cell's interference to the PRB is high, the low interference means that the neighboring cell's interference to the PRB is low, and the medium interference means that the neighboring cell's interference to the PRB is medium.

The UL IOI vector can be set to have a fixed cycle as shown in the following Equation (1).

$$IOI_k = IOI_{k+T} \text{ for all } k \quad (1)$$

In this case, the base station notifies a neighboring base station of a cycle T and ($IOI_0$, $IOI_1$, $IOI_2$, ..., $IOI_{T-1}$). The base station can notify a neighboring base station of only ($IOI_0$, $IOI_1$, $IOI_2$, ..., $IOI_{T-1}$) when the neighboring base station already has the information about the cycle T.

As described above, a UL IOI vector set differently in a time domain, for example, a UL IOI vector set differently according to each subframe, can be transmitted to neighboring cells, the neighboring cells can control the transmit power such the transmit power may be varied in the time domain.

For example, when a base station A experience a high inter-cell interference in a specific subframe, a UL IOI vector, set as 'high interference', of the specific subframe is transmitted to a neighboring base station B, the neighboring base station B reduce the uplink transmit power of the specific subframe so that the interference to the base station A can be reduced.

That is, the neighboring cell can set a transmit power of a PRB differently in a time domains, for example, the neighboring cell can set a transmit power of a PRB differently according to each subframe, so that the amount of the neighboring cell's interference can be dynamically managed in a time domain. As described above, a UL IOI vector set differently in the time domain, for example, a UL IOI vector set differently according to each subframe, can be transmitted to neighboring cell(s), so that the amount of the interference received from neighboring cell(s) can be maintained within appropriate amount in a situation where interference between neighboring cells varies with time.

Meanwhile, a subframe includes a plurality of PRBs. For respective N (N is a natural number equal to or greater than 2) PRBs belonging to a specific subframe, different UL IOIs can be set depending upon each PRB. Some of the N PRBs can be set to have the same UL IOI. Alternatively, all the PRBs can be set to have the same UL IOI in a special case.

For a similar reason, the present invention proposes a method of setting a UL HII vector comprised of UL HII values for PRBs in a subframe and transmitting a subframe-specific UL HII vector to neighboring cells. That is, when $HII_k$ is a UL HII vector of a $k^{th}$ subframe, where k is different from j, $HII_k$ and $HII_j$ are separately set and a UL HII vector of each subframe is reported to at least one of neighboring cells. That is, $HII_0$, $HII_1$, $HII_2$, ... are transmitted to the neighboring cells. The meaning of the subframe-specific UL HII vector does not exclude a case in which a UL HII vector is set to have the same vector among a plurality of subframes or among all subframes.

A UL HII value for a certain PRB can be 0 or 1. For example, UL HII value 0 indicates low interference sensitivity and UL HII value 1 indicates high interference sensitivity.

The UL HII vector can be set to have a fixed cycle as shown in the following Equation (2).

$$HII_k = HII_{k+T} \text{ for all } k \qquad (2)$$

In this case, the base station notifies a neighboring base station of a cycle T and ($HII_0$, $HII_1$, $HII_2$, ..., $HII_{T-1}$). The base station can notify a neighboring base station of only ($HII_0$, $HII_1$, $HII_2$, ..., $HII_{T-1}$) when the neighboring base station already has the information about the cycle T.

As described above, a UL HII vector set differently in a time domain, for example, a UL HII vector set differently according to each subframe, can be transmitted to neighboring cells, the neighboring cells can use resource pattern differently set in a time domain, for example differently set depending upon a subframe.

That is, the neighboring cell can set a UL HII vector differently in a time domains, for example, the neighboring cell can set a UL HII vector differently according to each subframe, so that the resources can be adaptively utilized in a situation where interference between neighboring cells varies with time.

Meanwhile, a subframe includes a plurality of PRBs. For respective N (N is a natural number equal to or greater than 2) PRBs belonging to a specific subframe, different UL HIIs can be set depending upon each PRB. Some of the N PRBs can be set to have the same UL HII. Alternatively, all the PRBs can be set to have the same UL HII in a special case.

For a similar reason, the present invention proposes a method of setting an RNTP vector comprised of RNTP values for PRBs in a subframe and transmitting the subframe-specific RNTP vector to neighboring cells. That is, when $RNTP_k$ is an RNTP vector of a $k^{th}$ subframe, where k is different from j, $RNTP_k$ and $RNTP_j$ are separately set and an RNTP vector of each subframe is reported to at least one of neighboring cells. That is, $RNTP_0$, $RNTP_1$, $RNTP_2$, ... are transmitted to the neighboring cells. The meaning of the subframe-specific RNTP vector does not exclude a case in which a RNTP vector is set to have the same vector among a plurality of subframes or among all subframes.

An RNTP value for a certain PRB can be 0 or 1, RNTP value 0 means that maximum transmit power does not exceed a certain threshold, and RNTP value 1 means that the maximum transmit power is not limited.

The RNTP vector can be set to have a fixed cycle as shown in the following Equation (3).

$$RNTP_k = RNTP_{k+T} \text{ for all } k \qquad (3)$$

In this case, the base station notifies a neighboring base station of a cycle T and ($RNTP_0$, $RNTP_1$, $RNTP_2$, ..., $RNTP_{T-1}$). The base station can notify a neighboring base station of only ($RNTP_0$, $RNTP_1$, $RNTP_2$, ..., $RNTP_{T-1}$) when the neighboring base station already has the information about the cycle T.

As described above, an RNTP vector set differently in a time domain, for example, an RNTP vector set differently according to each subframe, can be transmitted to neighboring cells, the neighboring cells can control the transmit power such the transmit power may be varied in the time domain.

That is, the neighboring cell can set a RNTP vector differently in a time domains, for example, the neighboring cell can set a UL HII vector differently according to each subframe, so that the resources can be adaptively utilized in a situation where interference between neighboring cells varies with time.

Meanwhile, a subframe includes a plurality of PRBs. For respective N (N is a natural number equal to or greater than 2) PRBs belonging to a specific subframe, different RNTPs can be set depending upon each PRB. Some of the N PRBs can be set to have the same RNTP. Alternatively, all the PRBs can be set to have the same RNTP in a special case.

For a similar reason, the present invention proposes a method of setting an RNTP threshold comprised of RNTP threshold values for PRBs in a subframe and transmitting the subframe-specific RNTP threshold to neighboring cells. That is, when $RNTPT_k$ is an RNTP threshold of a $k^{th}$ subframe, where k is different from j, $RNTPT_k$ and $RNTPT_j$ are separately set and an RNTP threshold of each subframe is reported to at least one neighboring cells. That is, $RNTPT_0$, $RNTPT_1$, $RNTPT_2$, ... are transmitted to the neighboring cells. Here, the RNTP threshold is a parameter for deciding a threshold for maximum transmit power.

The RNTP threshold can be set to have a fixed cycle as shown in the following Equation (4).

$$RNTPT_k = RNTPT_{k+T} \text{ for all } k \qquad (4)$$

In this case, the base station notifies a neighboring base station of a cycle T and ($RNTPT_0$, $RNTPT_1$, $RNTPT_2$, ..., $RNTPT_{T-1}$). The base station can notify a neighboring base station of only ($RNTPT_0$, $RNTPT_1$, $RNTPT_2$, ..., $RNTPT_{T-1}$) when the neighboring base station already has the information about the cycle T.

As described above, an RNTP threshold set differently in a time domain, for example, an RNTP threshold set differently according to each subframe, can be transmitted to neighboring cells, the neighboring cells can control the transmit power such the transmit power may be varied in the time domain. That is, the neighboring cell can set a RNTP threshold set differently in a time domains, for example, the neighboring cell can set a RNTP threshold differently according to each subframe, so that the resources can be adaptively utilized in a situation where interference between neighboring cells varies with time.

Meanwhile, a subframe includes a plurality of PRBs. For respective N (N is a natural number equal to or greater than 2) PRBs belonging to a specific subframe, different RNTP thresholds can be set. Some of the N PRBs can be set to have the same RNTP threshold. Of course, all the PRBs can be set to have the same RNTP threshold in a special case.

Figure 2:
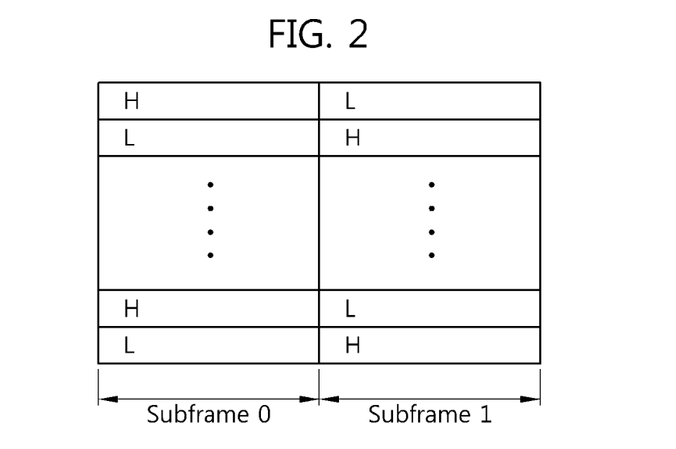
FIG. 2 is a conceptual diagram illustrating an inter-cell interference control method according to another example embodiment of the present invention.

FIG. 2 shows an example in which odd numbered PRBs of a plurality of PRBs belonging to a subframe 0 control such that a transmit power of resource elements used for transmitting a UE-specific Physical downlink shared channel (PDSCH) may not be limited, and even numbered PRBs controls such that a transmit power of resource elements used for transmitting a UE-specific Physical downlink shared channel (PDSCH) may have a low power lower than a critical value, according to values of the RNTP vector. Referring back to FIG. 2, odd numbered PRBs of a plurality of PRBs belonging to a subframe 1 control such that a transmit power of resource elements used for transmitting a UE-specific Physical downlink shared channel (PDSCH) may have a low power lower than a critical value, and even numbered PRBs controls such that a transmit power of resource elements used for transmitting a UE-specific Physical downlink shared channel (PDSCH) may not be limited.

Figure 3:
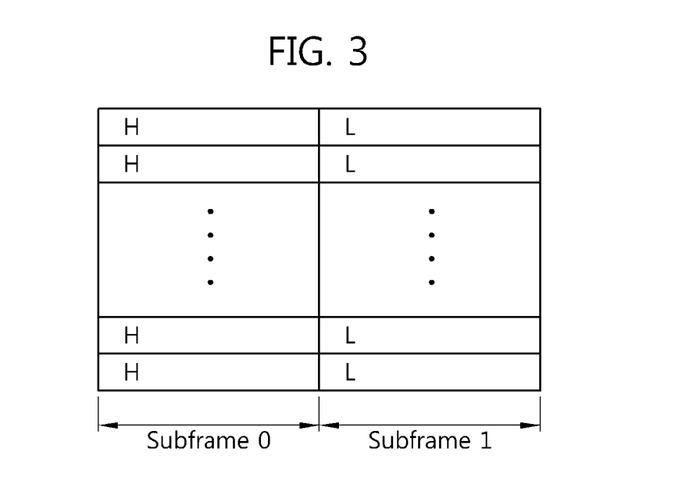
FIG. 3 is a conceptual diagram showing an example of power-controlled subframe transmission based on setting values of a relative narrowband transmit power (RNTP) vector according to an example embodiment of the present invention.

FIG. 3 shows an example in which all PRBs belonging to a subframe 0 control such that a transmit power of resource elements used for transmitting a UE-specific Physical downlink shared channel (PDSCH) may not be limited, and all PRBs belonging to a subframe 1 controls such that a transmit power of resource elements used for transmitting a UE-specific Physical downlink shared channel (PDSCH) may have a low power lower than a critical value, according to values of the RNTP vector.

Figure 4:
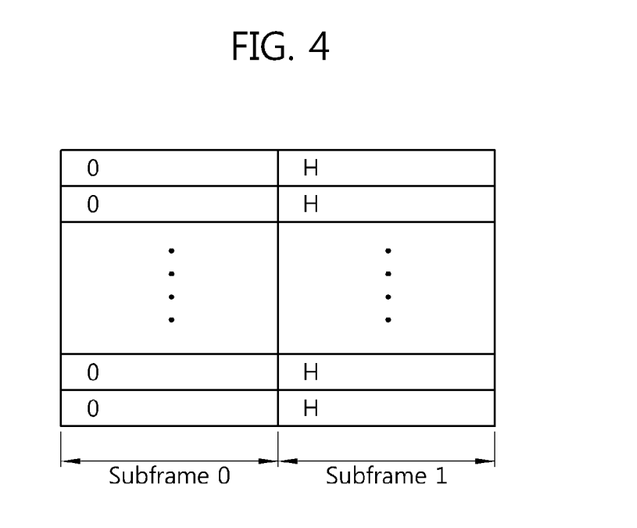
FIG. 4 is a conceptual diagram showing an example of power-controlled subframe transmission based on setting values of an RNTP vector according to another example embodiment of the present invention.

FIG. 4 shows a special case where all PRBs belonging to a subframe 0 control such that a transmit power of resource elements used for transmitting a UE-specific Physical downlink shared channel (PDSCH) may be substantially zero. Namely, referring to FIG. 4, UE-specific PDSCH is not transmitted in the subframe 0.

Figure 5:
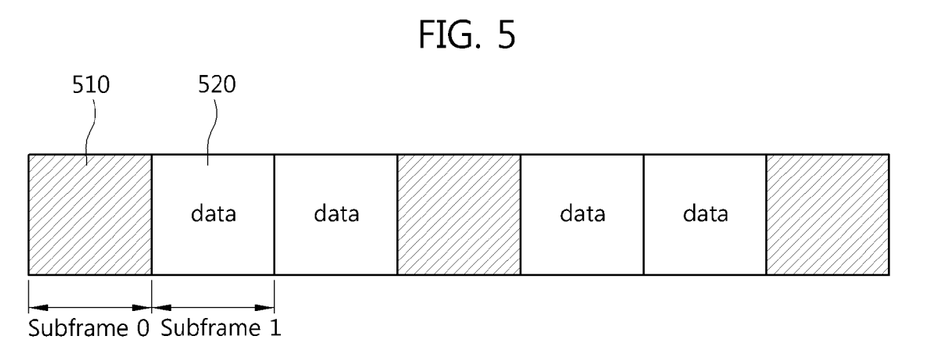
FIG. 5 is a conceptual diagram showing an example of power-controlled subframe transmission based on setting values of an RNTP vector according to still another example embodiment of the present invention.

FIG. 5 shows an example in which all PRBs belonging to a specific subframe control such that a transmit power of resource elements used for transmitting a UE-specific Physical downlink shared channel (PDSCH) may be substantially zero and the specific subframe is allocated periodically or aperiodically for transmission. In FIG. 5, a subframe 0 (510) is a specific subframe of which all PRBs control such that a transmit power of resource elements used for transmitting a UE-specific Physical downlink shared channel (PDSCH) may be substantially zero. Referring to FIG. 5, in a subframe 1, a transmit power of resource elements used for transmitting a UE-specific Physical downlink shared channel (PDSCH) may be allocated differently depending upon PRB or may have the same transmit power.

A heterogeneous network includes different cells which have different cell coverages. For example, a macrocell, a microcell, and a small cell or a low-power cell such as a picocell, a femtocell, or a relay node, are mixed in the heterogeneous network, and various types of base stations coexist and transmit power is different according to each base station.

The low-power node such as the picocell, the femtocell, or the relay node, or a small-coverage cell can be used to extend macrocell coverage or to solve the deficiency of capacity of the macrocell. Here, the small cell is referred to as the small-coverage cell, which includes the low-power node such as a picocell, a femtocell, or a relay node.

Strong received signal power from the macrocell greatly interferes with terminals belonging to coverage of both the macrocell and the picocell. In particular, in a heterogeneous network, which is different from a normal heterogeneous network, in which many low-power nodes are distributed, resource management, interference management, and UL/downlink design are necessary in consideration of a path loss and an interference level as well as received signal power.

Under a heterogeneous network environment where an interference pattern is dynamically variable, an RNTP vector, an RNTP threshold, a UL IOI vector, a UL HII vector or a UL IOI vector set differently in a time domain, i.e. on the time axis, for example, an RNTP vector, an RNTP threshold, a UL IOI vector, a UL HII vector or a UL IOI vector set differently depending upon a subframe, is transmitted to neighboring cells That is, adaptive inter-cell interference control can be performed according to a subframe. A second example embodiment of the present invention is as follows.

As a method of effectively handling neighboring cell's interference in the related art, there is a method of dividing radio resources into one or more radio resource groups, generating one or more radio resource attribute patterns using radio resource attributes, mapping radio resource attribute patterns to cell identities (IDs), and enabling each cell to use a radio resource according to a radio resource attribute pattern mapped to its own cell ID.

An example of one of the radio resource attributes is maximum allowable transmit power.

The performance of the above-described method is maximized when the following two items are optimally designed.
  Radio resource attribute patterns to be used
  Function of defining mapping between radio resource attribute patterns and cell IDs However, a specific radio resource attribute pattern and mapping are not constantly optimal, but the optimal radio resource attribute pattern and mapping are determined by various environmental factors. A specific radio resource attribute pattern can exhibit excellent performance in a certain environment, but may exhibit bad performance in other environments.

One of factors affecting the performance of a radio resource attribute pattern and mapping is the number of neighboring cells, which greatly interfere with its own cell.

In the second example embodiment of the present invention, an interference management method of mapping a radio resource attribute pattern to a cell ID that can exhibit excellent performance in any environment is proposed.

Figure 7:
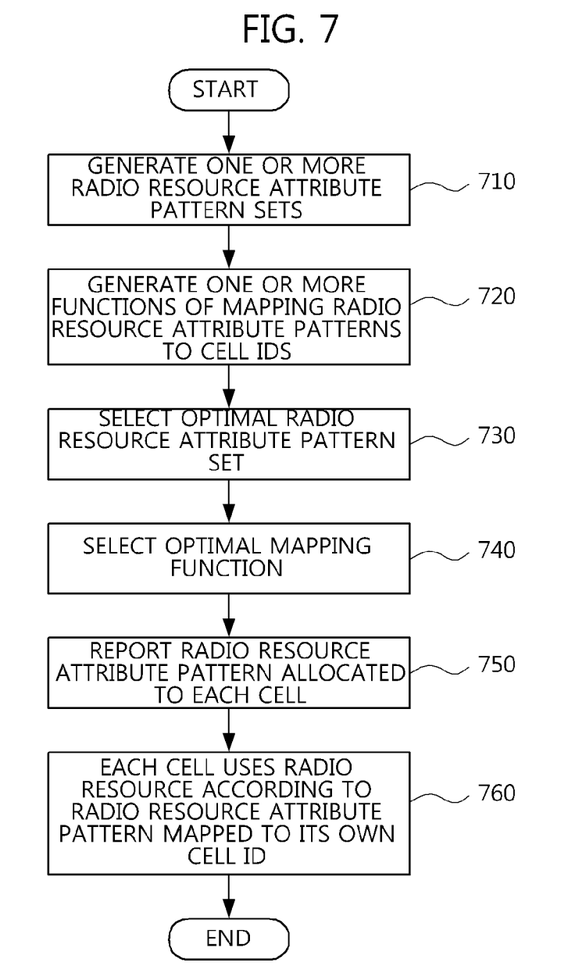
FIG. 7 is a flowchart illustrating a method of managing interference between neighboring cells according to a second example embodiment of the present invention.

FIG. 7 is a flowchart illustrating a method of managing interference between neighboring cells according to the second example embodiment of the present invention.

A system sets a radio resource attribute pattern set in consideration of its own environment. Also, the system sets a function of mapping radio resource attribute patterns to cell IDs in consideration of its own environment. As shown in FIG. 7, a method is proposed to easily decide the radio resource attribute pattern set and the mapping function and reduce an amount of information when the decided information is reported to cells.

Referring to FIG. 7, one or more radio resource attribute pattern sets are first generated (step 710). One or more functions of mapping radio resource attribute patterns to cell IDs are generated (step 720). Among the one or more radio resource attribute pattern sets previously generated, one optimal radio resource attribute pattern set is selected in consideration of a system environment (step 730). Among the previously generated one or more functions of mapping the radio resource attribute patterns to the cell IDs, one optimal mapping function is selected in consideration of the system environment (step 740). The radio resource attribute pattern and the function of mapping the radio resource attribute patterns to the cell IDs selected as described above are reported to each cell (step 750), and a radio resource is used according to a radio resource attribute pattern mapped to its own cell ID by using the radio resource attribute pattern and the function of mapping the radio resource attribute patterns to the cell IDs selected as described above (step 760)

Here, the optimal radio resource attribute pattern set and the optimal mapping function of mapping the radio resource attribute patterns to the cell IDs can be selected by an interference control apparatus, which controls interference between a plurality of cells located in a fixed area.

Figure 6:
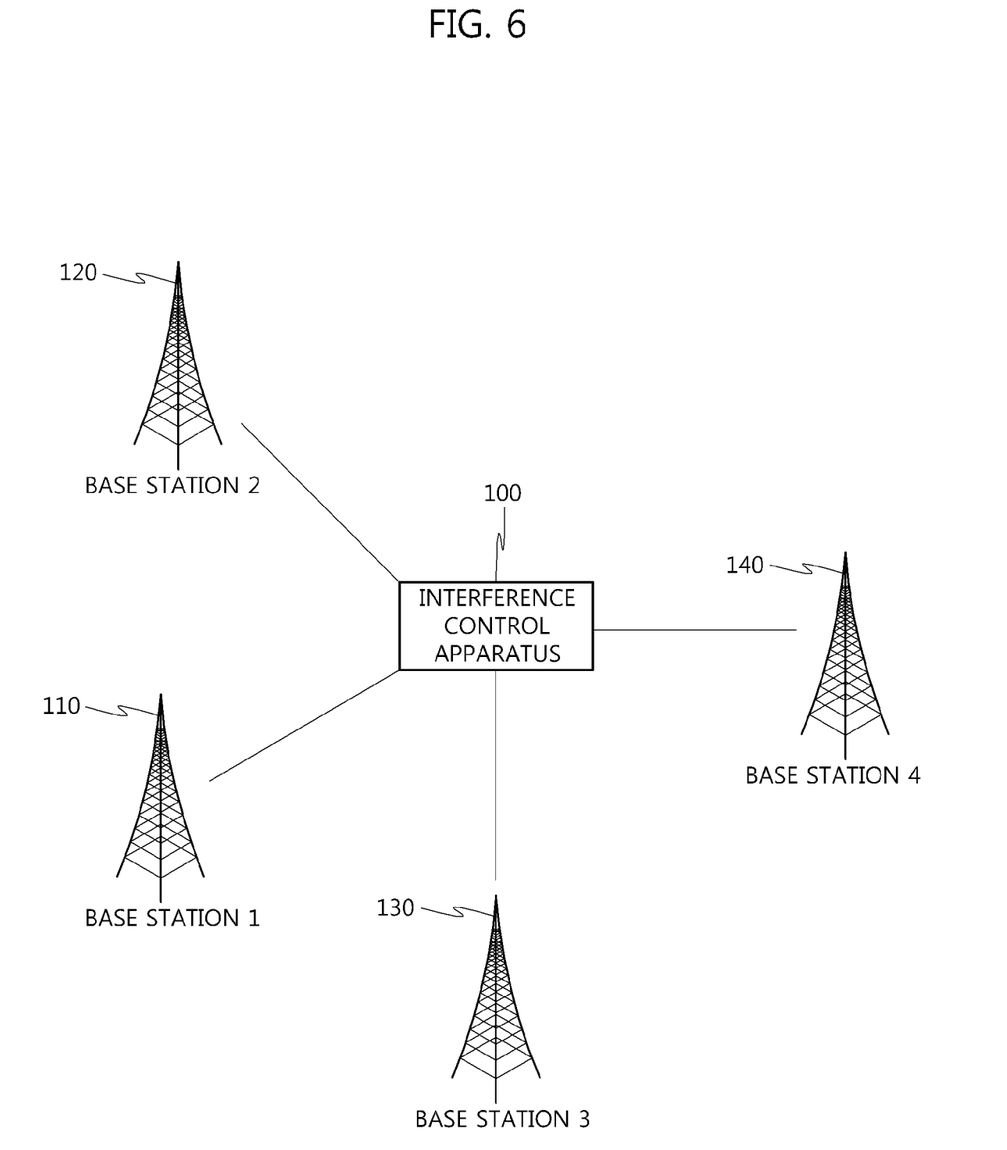
FIG. 6 is a conceptual diagram illustrating an inter-cell interference control method according to another example embodiment of the present invention.

FIG. 6 is a conceptual diagram illustrating an inter-cell interference control method according to another example embodiment of the present invention. FIG. 6 shows a interference control apparatus 100 and four base stations 110, 120, 130, and 140 under control of the interference control apparatus 100. The interference control apparatus 100 transmits a selected radio resource attribute pattern set and a selected function of mapping radio resource attribute patterns to cell IDs to cells managed by the interference control apparatus 100 itself.

The interference control apparatus 100 may be installed within a master femto base station or a femtocell base station gateway. The interference control apparatus 100 can notify other femto base stations of related information through an X2 interface.

The interference control apparatus 100 can use the following method as a method of notifying cells of radio resource attribute patterns allocated to the cells.

The interference control apparatus 100 notifies the cells of radio resource attribute patterns allocated to the cells. The interference control apparatus 100 reports IDs of a corresponding cell and neighboring cells thereto and radio resource attribute patterns allocated to the neighboring cells.

Figure 8:
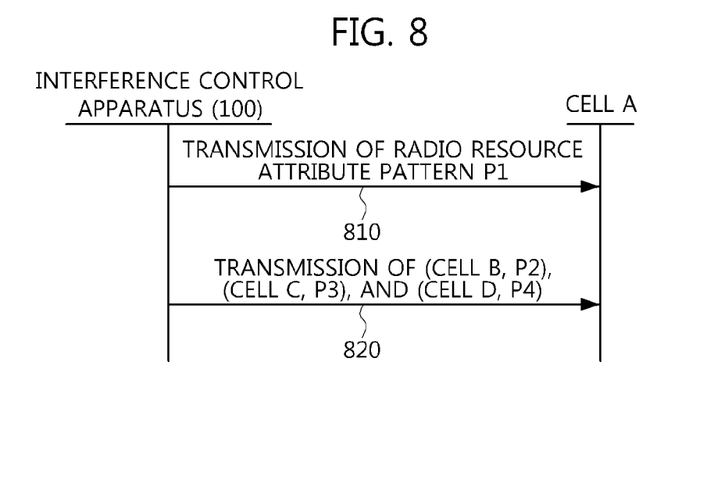
FIG. 8 is a sequence diagram illustrating an example in which an interference control apparatus transmits a radio resource attribute pattern to a cell 'A'.

For example, it is assumed that a list of cells neighboring a cell A is (Cell B, Cell C, Cell D). Also, it is assumed that radio resource attribute patterns respectively allocated to the cell A, the cell B, the cell C, and the cell D are P1, P2, P3, and P4. The interference control apparatus 100 transmits the radio resource attribute pattern P1 of the cell A to the cell A. The interference control apparatus 100 transmits information of (Cell B, P2), (Cell C, P3), and (Cell D, P4) to the cell A (Refer to FIG. 8).

The cells transmit information such as the number of neighboring cells and neighboring cell IDs to the interference control apparatus so that the interference control apparatus can use the information to select the optimal resource attribute pattern set and the optimal function of mapping radio resource attribute patterns to cell IDs.

In the present invention, the cell ID may be a physical layer cell ID or a cell global ID.

In methods of controlling neighboring cell's interference according to example embodiments of the present invention, system performance can be improved by dynamically managing neighboring cell's interference in a situation where the neighboring cell's interference varies with time. For example, inter-cell interference can be effectively reduced in a heterogeneous network by dynamically controlling the inter-cell interference in the heterogeneous network in which neighboring cell's interference varies with time. Excellent performance of neighboring cell's interference control is provided by adaptively providing an interference environment with an interference management method of mapping radio resource attribute patterns to cell IDs.

While the example embodiments of the present invention and their advantages have been described in detail, it should be understood that various changes, substitutions and alterations may be made herein without departing from the scope of the invention.

What is claimed is:

1. A method of controlling interference between neighboring cells, comprising:
    differently setting inter-cell interference control information in a time domain, wherein the differently setting inter-cell interference control information in the time domain includes differently setting the inter-cell interference control information for each subframe; and
    transmitting the inter-cell interference control information differently set in the time domain to at least one neighboring cell.

2. The method of claim 1, wherein the inter-cell interference control information includes at least one of a relative narrowband transmit power (RNTP), an RNTP threshold, a uplink (UL) high interference indication (HII), and a uplink (UL) interference overload indication (IOI).

3. The method of claim 1, wherein the differently setting inter-cell interference control information in a time domain includes setting a transmit power of resource elements of all physical resource block of a predetermined subframe to be substantially zero, the resource elements being used for transmitting a UE-specific Physical downlink shared channel (PDSCH).

4. The method of claim 1, wherein the method is used in a heterogeneous network deployment in which a low-power cell and a high-power cell are mixed.

5. The method of claim 1, wherein the method is used in at least one of a first heterogeneous deployment in which a first macrocell and a femtocell are deployed and a second heterogeneous deployment in which a second macrocell and a picocell are deployed.

6. A method of controlling interference between neighboring cells, comprising:
    differently setting a maximum transmit power of resource elements of physical resource block in a time domain, the resource elements being used for transmitting a UE-specific Physical downlink shared channel (PDSCH), wherein the maximum transmit power of the resource elements of the physical resource block is differently set for each subframe; and
    transmitting the maximum transmit power of the resource elements of the physical resource block to at least one neighboring cell.

7. The method of claim 6, wherein, in a first subframe, the transmit power of the resource elements of all physical resource block has a substantially zero, and in a second subframe, the transmit power of the resource elements of the physical resource block has different value or the same value.

8. An interference control method of managing an interference between neighboring cells, comprising:
    transmitting a selected radio resource attribute pattern set to at least one cell that is managed by an interference control apparatus, wherein the interference control apparatus differently sets inter-cell interference control information in a time domain for each subframe; and
    transmitting a function, which maps a radio resource attribute pattern to a cell identify (ID) for each of the at least one cell that is managed by the interference control apparatus, to the at least one cell that is managed by the interference control apparatus.

9. The interference control method of claim 8, further comprising selecting an optimal radio resource attribute pattern set from at least one radio resource attribute pattern set in consideration of a system environment.

10. The interference control method of claim 9, further comprising selecting an optimal mapping function from at least one function of mapping the radio resource attribute pattern to the cell ID in consideration of the system environment.

11. The interference control method of claim 10, further comprising controlling a radio resource to be used according to the radio resource attribute pattern mapped to the cell ID of each of the at least one cell that is managed by the interference control apparatus on the basis of the selected radio resource attribute pattern and the selected mapping function of defining mapping between the radio resource attribute pattern and the cell ID.

12. The interference control method of claim 8, wherein each of the at least one cell that is managed by the interference control apparatus provides the interference control apparatus with information including at least one of the number of neighboring cells and neighboring cell IDs, the number of neighboring cells and the neighboring cell IDs being used to select the optimal radio resource attribute pattern set and an optimal function of mapping an optimal cell ID to a radio resource attribute pattern.

13. The interference control method of claim 8, wherein the interference control method is used in at least one of a first heterogeneous deployment in which a first macrocell and a femtocell are deployed and a second heterogeneous deployment in which a second macrocell and a picocell are deployed.

14. An interference control apparatus for managing interference between neighboring cells, wherein the interference control apparatus transmits a selected radio resource attribute pattern set to at least one cell that is managed by the interference control apparatus, wherein the interference control apparatus differently sets inter-cell interference control information in a time domain for each subframe, and transmits a function, which maps a radio resource attribute pattern to a cell identity (ID) for each of the at least one cell that is managed by the interference control apparatus, to the at least one cell that is managed by the interference control apparatus.

15. The interference control apparatus of claim 14, wherein the interference control apparatus selects an optimal radio resource attribute pattern set from at least one radio resource attribute pattern set in consideration of a system environment.

16. The interference control apparatus of claim 15, wherein the interference control apparatus selects an optimal mapping function from at least one function of mapping the radio resource attribute pattern to the cell ID in consideration of the system environment.

17. The interference control apparatus of claim 16, wherein the interference control apparatus controls a radio resource to be used according to the radio resource attribute pattern mapped to the cell ID of each of the at least one cell that is managed by the interference control apparatus on the basis of the selected radio resource attribute pattern and the selected mapping function of defining mapping between the radio resource attribute pattern and the cell ID.

18. The interference control apparatus of claim 14, wherein the interference control apparatus operates in at least one of a first heterogeneous deployment in which a first macrocell and a femtocell are deployed and a second heterogeneous deployment in which a second macrocell and a picocell are deployed.

* * * * *